United States Patent
MacDonald et al.

(10) Patent No.: US 10,835,845 B2
(45) Date of Patent: Nov. 17, 2020

(54) WATER FILTRATION APPARATUS WITH IMPROVED FILTER CARTRIDGE HOUSING AND DISTRIBUTOR

(71) Applicant: Filter Group Inc., North York (CA)

(72) Inventors: Daniel Nicholas MacDonald, Toronto (CA); Miguel A. Castellote, Saint Marguerite (CA)

(73) Assignee: Filter Group Inc., North York (CA)

(*) Notice: Subject to any disclaimer, the term of this patent is extended or adjusted under 35 U.S.C. 154(b) by 0 days.

(21) Appl. No.: 15/936,137

(22) Filed: Mar. 26, 2018

(65) Prior Publication Data

US 2019/0291029 A1    Sep. 26, 2019

(51) Int. Cl.
| | |
|---|---|
| *B01D 29/96* | (2006.01) |
| *B01D 35/147* | (2006.01) |
| *B01D 35/157* | (2006.01) |
| *B01D 35/30* | (2006.01) |
| *B01D 29/90* | (2006.01) |
| *B01D 29/92* | (2006.01) |
| *C02F 1/00* | (2006.01) |

(52) U.S. Cl.
CPC ............ *B01D 29/96* (2013.01); *B01D 29/90* (2013.01); *B01D 29/92* (2013.01); *B01D 35/1475* (2013.01); *B01D 35/1573* (2013.01); *B01D 35/30* (2013.01); *C02F 1/001* (2013.01); *B01D 2201/16* (2013.01); *B01D 2201/302* (2013.01); *B01D 2201/4015* (2013.01); *C02F 2201/004* (2013.01); *C02F 2201/005* (2013.01); *C02F 2201/006* (2013.01)

(58) Field of Classification Search
CPC .......... B01D 2201/16; B01D 2201/291; B01D 2201/302; B01D 2201/4015; B01D 2201/4084; B01D 29/15; B01D 29/56; B01D 29/90; B01D 29/92; B01D 29/96; B01D 35/02; B01D 35/1475; B01D 35/1573; B01D 35/30; B01D 35/303; B01D 35/306; C02F 1/001; C02F 2201/004; C02F 2201/005; C02F 2201/006
See application file for complete search history.

(56) References Cited

U.S. PATENT DOCUMENTS

| | | | | |
|---|---|---|---|---|
| 10,126,043 | B2 * | 11/2018 | Mitchell | ............... F25D 23/126 |
| 2007/0227959 | A1 * | 10/2007 | Sinur | ..................... B01D 29/96 |
| | | | | 210/232 |
| 2007/0284296 | A1 * | 12/2007 | Swain | .................. B01D 35/153 |
| | | | | 210/235 |

FOREIGN PATENT DOCUMENTS

CN    205435162 U  *  8/2016

OTHER PUBLICATIONS

English Abstract of CN-205435162-U. 2016.*

* cited by examiner

*Primary Examiner* — Terry K Cecil
(74) *Attorney, Agent, or Firm* — Bennett Jones LLP

(57) ABSTRACT

An improved cartridge housing assembly and distributor is provided for a water filtration system installed at a point-of-use or a point-of entry of plumbing networks in buildings. The improvements include a mechanism for actuating a shut-off valve and a pressure-relief valve upon removing the housing assembly from the distributor, a bayonet-type mount between the housing assembly and the distributor, a housing lid to prevent spilling of water when the housing assembly is removed from the distributor, and fastener clips that allow for modular attachment of the distributor to plumbing fittings and a mounting bracket.

5 Claims, 9 Drawing Sheets

WATER FILTRATION APPARATUS WITH IMPROVED FILTER CARTRIDGE HOUSING AND DISTRIBUTOR

FIELD OF THE INVENTION

The present invention generally relates to water filtration systems installed at a point-of-use or a point-of entry of plumbing networks in buildings. More particularly, the present invention relates to improvements to a filter cartridge housing assembly and distributor that include a mechanism for actuating a shut-off valve and a pressure-relief valve upon removing the housing assembly from the distributor, a locking mount between the housing assembly and the distributor, a housing lid to prevent spilling of water when the housing assembly is removed from the distributor, and fasteners clips that allow for modular attachment of the distributor to plumbing fittings and a mounting bracket.

BACKGROUND OF THE INVENTION

FIG. 1 shows a side view of a conventional multi-stage water filtration system, as may be installed as a point-of-use system beneath a sink to filter water for a single faucet. The system has a mounting bracket that attaches multiple filter assemblies linked in series to a structure such as the inside wall of an under-sink cabinet. Each filter assembly has a distributor that is connected to inflow and outflow lines, and a filter housing that holds a filter cartridge. The distributor directs unfiltered water from the inflow line to the filter housing where the filter cartridge traps contaminants, and directs filtered water from the filter housing to the outflow line. The filter housing has a canister form with an open top end and a closed bottom end. The bottom of the distributor and the top end of the filter housing have complementary threads so that the filter housing can be screwed onto the distributor, which acts as a cap for the open top end of the filter housing.

When the filter cartridge in a conventional water filtration system requires replacement, the lines connected to the distributor are isolated with valves. Next, any excess pressure in the filter housing is relieved by opening the faucet to which the system is connected. Alternatively, it is known to provide filter cartridges having integrated pressure release mechanisms. However, such filter cartridges are made of plastic, which creates additional non-biodegradable waste, and may not be readily recyclable. The filter housing is then unscrewed from the distributor. However, since a water-tight seal between the filter housing and the distributor is imperative, the filter housing should be screwed on tightly to the distributor. Therefore, unscrewing the filter housing from the distributor may require a substantial torque, which may be greater than that which can be applied by a typical user's unassisted hands. As such, a splined key wrench may be provided to engage grooves on the outer surface of the housing to screw on and screw off the housing from the distributor, but this makes the system more complicated. Moreover, upon unscrewing the housing from the distributor, the filter housing may be full of water, which may spill out of the open top end of the filter housing before the water can be poured into a bucket or down a drain.

Proper installation and assembly of a conventional multi-stage water filtration system, requires plumbing skills that may be beyond those possessed by the typical home owner. This is because the system requires installation of standard tubing with threaded and taped fittings, or push-fit fittings to create a water-tight flow path between the filter assemblies. Further, if a particular stage of the system needs to be isolated for trouble-shooting, then the associated fittings must be dismantled and re-installed, which creates a major disincentive to doing so.

A conventional multi-stage water filtration system cannot be readily re-configured for a different number of filter assemblies. This is because the bracket is specifically designed to hold a predetermined number of filter assemblies. This creates complexity for manufacturers and vendors who wish to supply single-stage systems, double-stage systems, and triple-stage systems, because such systems must be supplied as different sets of parts. This also prevents a user from upgrading an existing system with additional stages of filter assemblies. Rather, the user must replace the existing system in its entirety with a new system having the desired number of stages.

Accordingly, there is a need in the art for a water filtration system that allows for cleaner and more convenient replacement of the filter cartridge, and greater ease of manufacturing, installation, upgrading, and maintenance.

SUMMARY OF THE INVENTION

In a first aspect, the present invention comprises an apparatus for filtering water. The apparatus comprises a housing assembly, a distributor, and a shut-off valve. The housing assembly comprises a housing canister that defines a housing interior for holding a filtration medium. The distributor defines at least part of an inflow passage for directing water flow from a distributor inlet to the housing interior, and at least part of an outflow passage for directing water flow from the housing interior to a distributor outlet. The shut-off valve is for regulating water flow between the housing interior and the distributor inlet, and the distributor outlet. The housing assembly is removably attachable to the distributor by rotation relative to the distributor in a first direction, whereupon the housing assembly actuates movement of the shut-off valve to an open position permitting water flow through the inflow passage and through the outflow passage. The housing assembly is detachable from the distributor by rotation relative to the distributor in a second direction opposite to the first direction, whereupon the housing assembly actuates movement of the shut-off valve to a closed position preventing water flow through the inflow passage and through the outflow passage.

In an embodiment of the apparatus, the housing assembly comprises a housing lid removably attachable, in sealing relationship, to the housing canister, wherein the housing lid defines a housing lid aperture permitting water flow between the housing interior and the distributor. The housing lid may engage the shut off valve to actuate movement of the shut-off valve between the open position and the closed position. The housing lid may comprise a pressure relief valve for relieving pressure from the housing interior. Rotation of the housing assembly relative to distributor in the first direction actuates movement of the pressure-relief valve to a closed position preventing gas flow out of the housing interior. Rotation of the housing assembly relative to distributor in the second direction actuates movement of the pressure-relief valve to an open position permitting gas flow out of the housing interior.

In a second aspect, the present invention comprises an apparatus for filtering water. The apparatus comprises a housing canister, a housing lid, and a distributor, and a housing lid. The housing canister defines a housing interior for holding a filtration medium. The housing lid is removably attached, in sealing relationship, to the housing canister.

The housing lid defines a housing lid aperture permitting water flow into and out of the housing interior. The distributor is removably attachable to the housing assembly, and defines at least part of an inflow passage for directing water flow from a distributor inlet to the housing interior via the housing lid aperture, and at least part of an outflow passage for directing water flow from the housing interior to a distributor outlet via the housing lid aperture.

In an embodiment of the apparatus, the housing assembly is removably attachable to the distributor by a bayonet-type mount comprising an L-shaped slot formed by one of the housing lid and the distributor, and a radially extending tab formed by the other one of the housing lid and the distributor. The L-shaped slot may define a stepped-shaped detent that causes the housing lid to move axially into engagement with the distributor upon movement of the radially extending tab past the stepped-shaped detent.

In a third aspect, the present invention comprises a distributor assembly for use in a water filtering apparatus comprising a housing for holding a filtration medium. The assembly comprises a distributor for directing water flow into and out of the housing, and a plurality of identical factors. The distributor defines a distributor inlet for removably receiving an inlet fitting in sealing relationship to the distributor. The distributor also defines a distributor outlet for removably receiving an outlet fitting in sealing relationship to the distributor. Each fastener comprises a pair of clip members resiliently separable from each other. A first fastener has clip members which are removably insertable through a first pair of passages defined by the distributor to engage the inlet fitting received in the distributor inlet, and thereby removably secure the inlet fitting within the distributor inlet. A second fastener has clip members which are removably insertable through a second pair of passages defined by the distributor to engage the outlet fitting received in the distributor outlet, and thereby removably secure the outlet fitting within the distributor outlet.

In an embodiment of the assembly, the assembly may further comprise a bracket for mounting the water filtering apparatus to the structure. A third fastener has clip members which are removably insertable through a third pair of passages defined by the distributor to engage the bracket, and thereby removably secure the bracket to the distributor.

In an embodiment of the assembly, each of the fasteners may further comprise a tab removably insertable into one of a plurality of slots defined by the distributor to secure the fastener to the distributor.

BRIEF DESCRIPTION OF THE DRAWINGS

In the drawings shown in the specification, like elements may be assigned like reference numerals. The drawings are not necessarily to scale, with the emphasis instead placed upon the principles of the present invention. Additionally, each of the embodiments depicted are but one of a number of possible arrangements utilizing the fundamental concepts of the present invention.

DETAILED DESCRIPTION OF PREFERRED EMBODIMENT

Definitions

Any term or expression not expressly defined herein shall have its commonly accepted definition understood by a person skilled in the art.

Overview.

Figure 1:
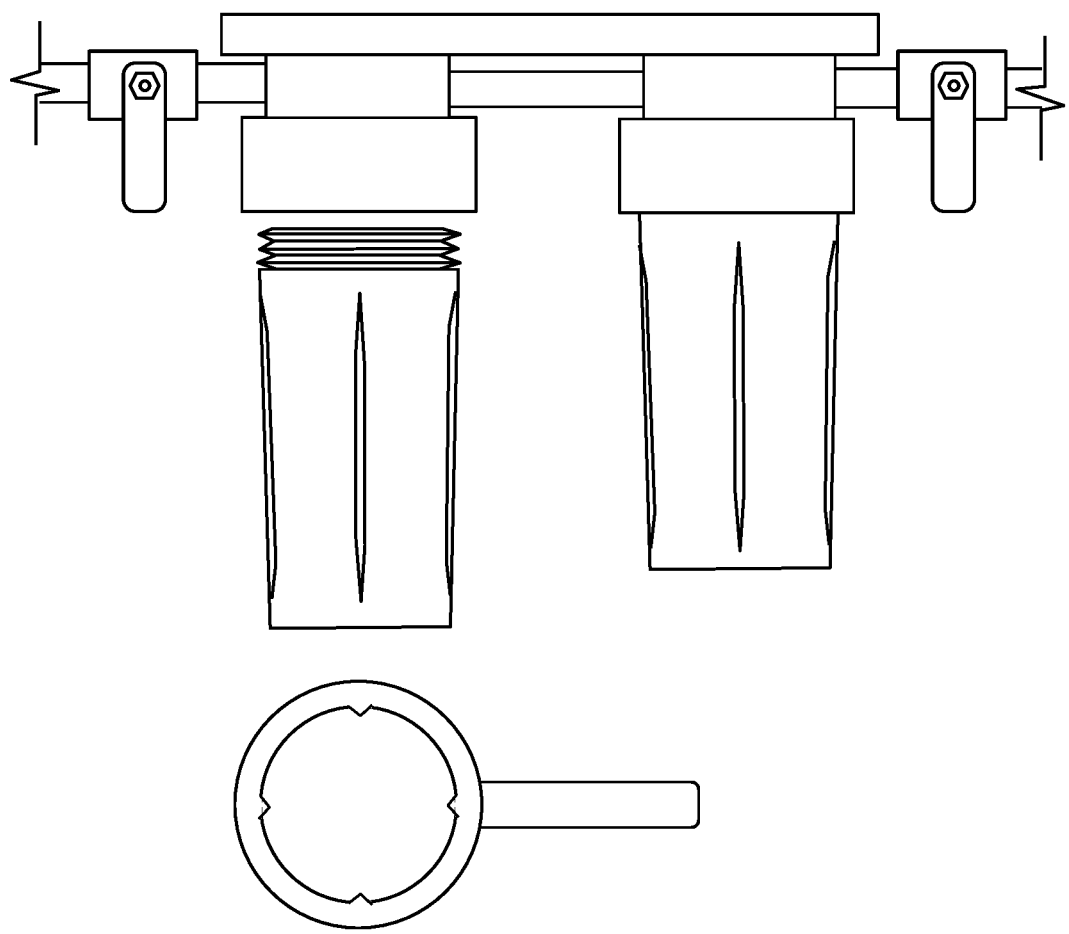
FIG. 1 shows a side view of a water filtration system in the prior art.
Figure 2:
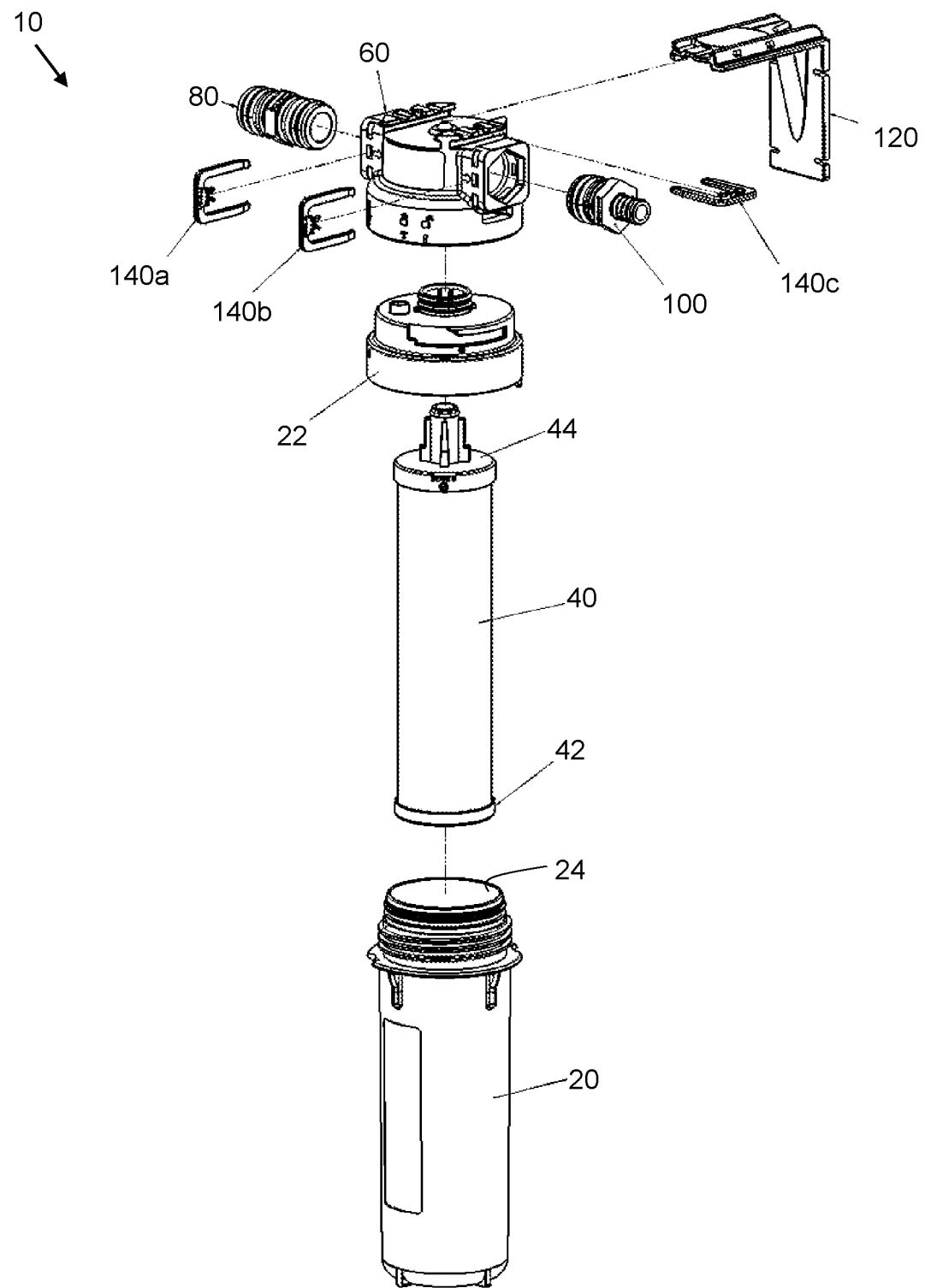
FIG. 2 shows an exploded perspective view of an embodiment of an apparatus of the present invention.
Figure 3:
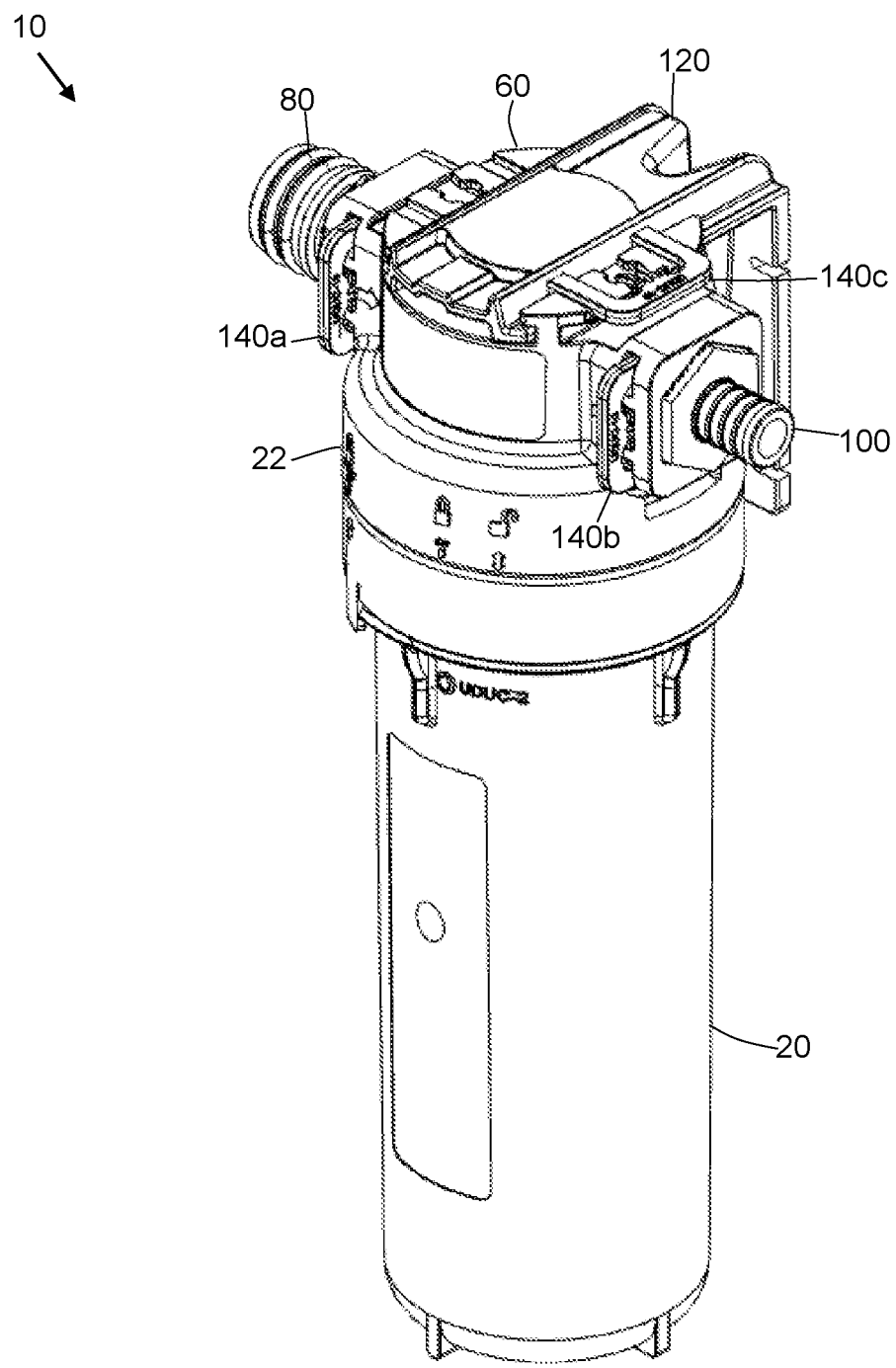
FIG. 3 shows a perspective view of the apparatus of FIG. 2.
Figure 4:
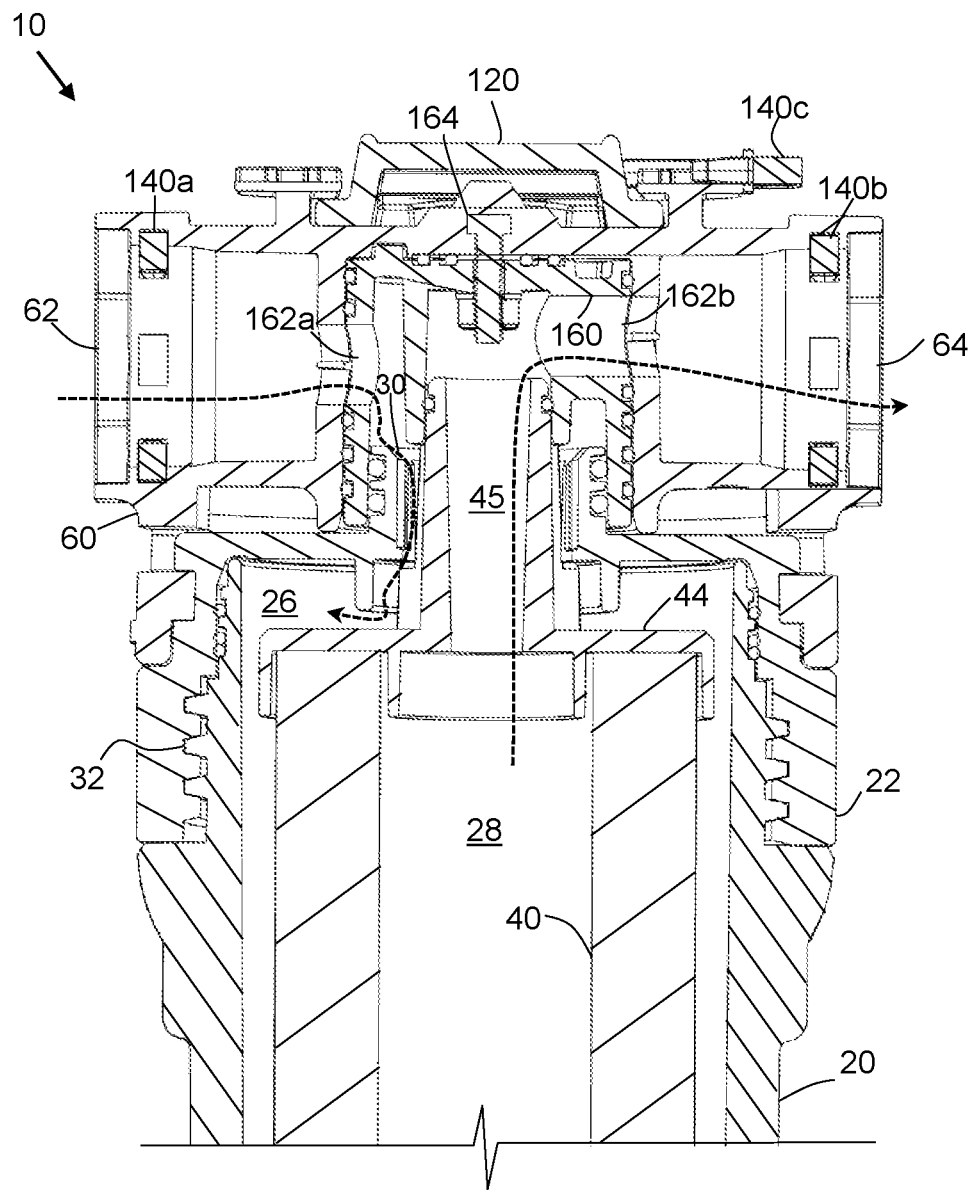
FIG. 4 shows a front cross-sectional midline view of an upper portion of the apparatus of FIG. 2, without the inlet fitting and the outlet fitting shown in FIG. 2.
Figure 8:
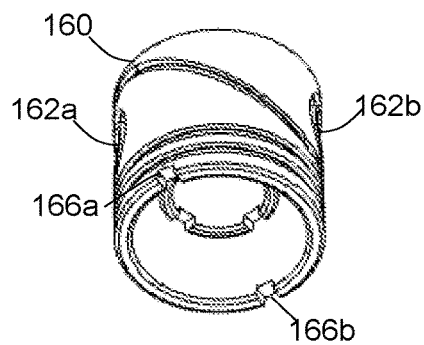
FIG. 8 shows a bottom perspective view of the shut-off valve of the apparatus of FIG. 2.
Figure 9:
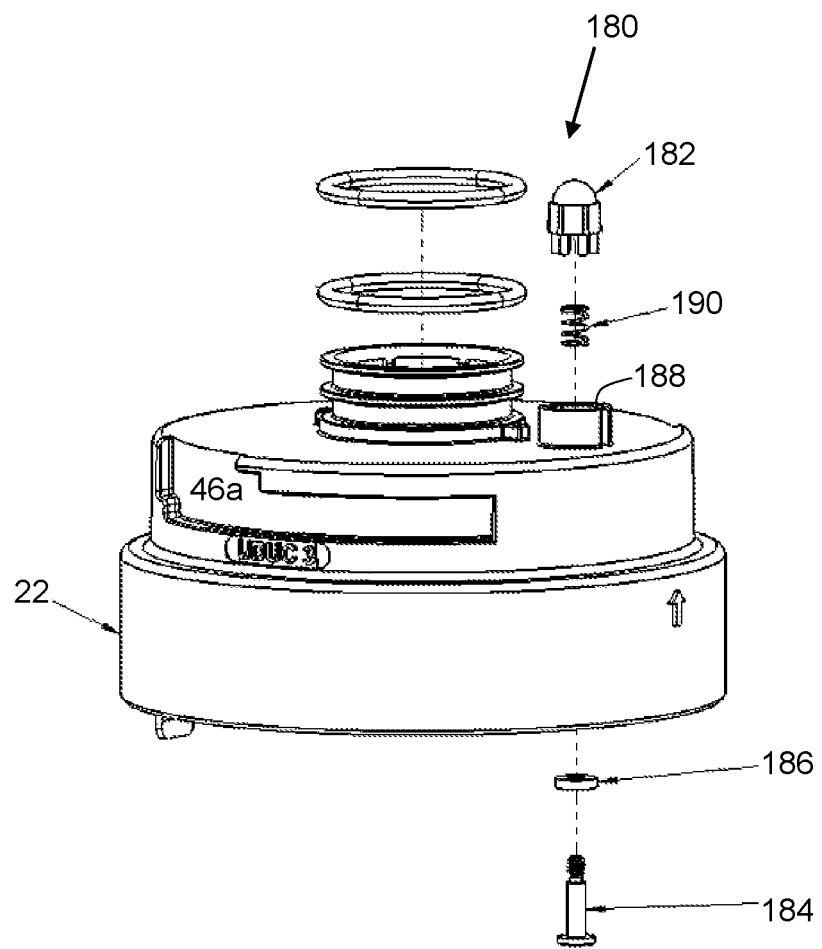
FIG. 9 shows an exploded perspective view of the housing lid and pressure relief valve of the apparatus of FIG. 2.

FIG. 2 shows an embodiment of an apparatus (10) of the present invention for filtering water. Referring to FIGS. 2 and 3, the embodiment of the apparatus (10) includes a housing assembly comprising a housing canister (20) and a housing lid (22). The embodiment of the apparatus (10) also includes a filter cartridge (40), a lower filter cartridge cap (42), an upper filter cartridge cap (44), a distributor (60), an inlet fitting (80), an outlet fitting (100), a bracket (120), and three fasteners (140a, 140b, 140c). Referring to FIGS. 4 and 8, the embodiment of the apparatus (10) also includes a shut-off valve (160). Referring to FIG. 9, the embodiment of the apparatus (10) also includes a pressure-relief valve (180). These and other parts of the apparatus (10), and its use and operation are described in greater detail below.

Housing Canister.

The housing canister (20) defines a housing interior (24) for holding a filtration medium, which may be in the form of a tubular filter cartridge (40). The housing canister (20) extends vertically from a bottom end that is closed, to a top end that defines an opening sized to allow the filtration medium to be inserted into and removed from the housing interior (24).

Tubular filter cartridges (40) are known to persons of ordinary skill in the art of water filtration systems. The present invention is not limited by any particular type of filtration medium of the filter cartridge (40). Filter cartridges (40) are available in a variety of sizes, and may contain a variety of different types of filtration media. As a non-limiting example, the filter cartridge (40) may be a "pre-filter" made of polypropylene, for removing particulate contaminants such as sediment and rust particles from water. As another non-limiting example, the filter cartridge (40) may contain granular activated carbon for removing chlorine, heavy metals, and volatile organic compounds from water.

As shown in FIG. 4, when the filter cartridge (40) is disposed in the housing interior (24), the filter cartridge (40) divides the housing interior (24) into a feed zone (26) and a filtrate zone (28). The feed zone (26) refers to that portion of the housing interior (24) through which water flows before passing through the filter cartridge (40). Conversely, the filtrate zone (28) refers to that portion of the housing interior (24) through which water flows after passing through the filter cartridge (40). In the embodiment shown in FIG. 4, the feed zone (26) and filtrate zone (28) are located on the radially outward and radially inward sides, respectively, of the filter cartridge (40), so that water flows radially inwards through the filter cartridge (40) towards the center of the housing canister (20). In other embodiments the position of the feed zone (26) and filtrate zone (28) may be reversed so that water flows radially outwards through the filter cartridge (40) away from the center of the housing canister (20).

Figure 6:
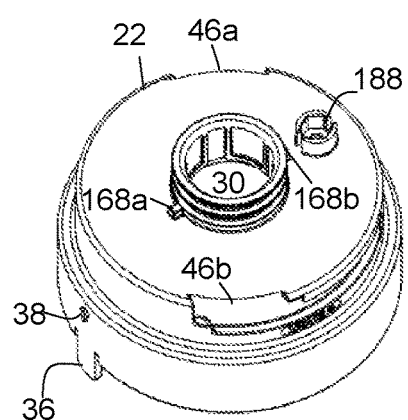
FIG. 6 shows a top perspective view of the housing lid of the apparatus of FIG. 2.

In the embodiment shown in FIGS. 2 and 4, an upper filter cartridge cap (44) is provided. In the embodiment shown, the upper filter cartridge cap (44) is made of plastic. In the embodiment shown, the upper filter cartridge cap (44) defines a central opening (45) that extends through a central housing lid aperture (30) (as also seen in FIG. 6) from a bottom end of the cap (44) that is disposed in the opening defined by the filter cartridge (40) to a top end of the cap (44) that is disposed in an opening of the shut-off valve (160) (as also seen in FIG. 8). An O-ring gasket is provided at the upper end of the cap (44) to create a water-tight seal between the cap (44) and the shut-off valve (160).

In the embodiments shown in the Figures, the housing canister (20) is molded from propylene copolymer or copolyester resin. The housing canister (20) may be opaque, or may be transparent so that the filter cartridge (40) is visible when inside the housing interior (24). In other embodiments, the housing canister (20) may be made of different materials.

In the embodiments shown in the Figures, the housing canister (20) has a circular horizontal cross-sectional shape so that the housing canister (20) as a whole has a substantially cylindrical shape. In other embodiments, the housing canister (20) may have different cross-sectional shapes.

Housing Lid.

The housing lid (22) is removably attached in sealing relationship to the top end of the housing canister (20). In the embodiment shown in FIG. 6, the housing lid (22) defines a central housing lid aperture (30) permitting water flow between the housing interior (24) and the distributor (60). Notwithstanding the housing lid aperture (30), the housing lid (22) helps to prevent accidental spillage of water out of the housing interior (24), when the housing canister (20) is detached from the distributor (60). Preferably, the housing lid aperture (30) is substantially smaller than the housing lid (22).

In the embodiment shown in the Figures, the housing lid (22) is molded from propylene copolymer. In other embodiments, the housing lid (22) may be made of different materials.

In the embodiment shown in FIG. 4, the top end of the housing canister (20) and the bottom surface of the housing lid (22) define a threaded connection (32) that allows the housing lid (22) to be screwed onto the housing top end. Multiple O-ring gaskets made of ethylene propylene diene monomer (EPDM) rubber are provided to better ensure a water-tight seal between the housing lid (22) and the housing canister (20) top end. In other embodiments, the housing lid (22) may be removably attached in sealing relationship to the top end of the housing canister (20) using other types of connections and sealing elements as necessary.

Figure 7:
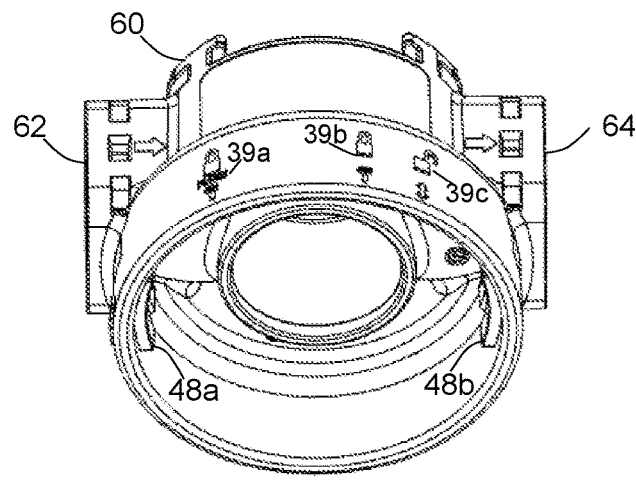
FIG. 7 shows a bottom perspective view of the distributor of the apparatus of FIG. 2.
Figure 5:
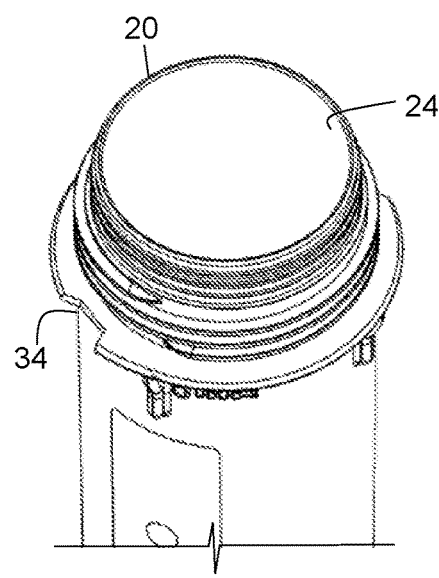
FIG. 5 shows a top perspective view of an upper portion of the housing canister of the apparatus of FIG. 2.

In the embodiment shown in FIG. 5, the housing canister (20) defines a notch (34). In the embodiment shown in FIG. 6, the bottom edge of the housing lid (22) defines a downwardly extending tab (36) that is received in the notch (34). It will be understood that the downwardly extending tab (36) is sufficiently flexible to travel into and out of the notch (34) when the housing lid (22) is screwed onto and unscrewed from the housing canister (20). The engagement of the tab (36) in the notch (34) limits tightening of the housing lid (22) on to the housing canister (20). It also ensures that an arrow marking (38) on the outer surface of the housing lid (22) may be aligned with one of a series markings (39a, 39b, 39c) on the outer surface of the distributor (60) as shown in the embodiment shown in FIG. 7, so as to properly indicate the state of attachment of the housing assembly to the distributor (60), and the position of the shut-off valve (160) and pressure-relief valve (180), as discussed below.

Distributor.

The distributor (60) defines at least part of an inflow passage for directing water flow from a distributor inlet (62) to the feed zone (26) of the housing interior (24), and at least part of an outflow passage for directing water flow from the filtrate zone (28) of the housing interior (24) to a distributor outlet (64). In the embodiment shown in FIG. 4, water flow through the inflow passage and the outflow passage is shown by dashed lines.

In the embodiment shown in the Figures, the distributor (60) is molded from propylene copolymer. In other embodiments, the distributor (60) may be made of different materials.

In contrast to a conventional system, the embodiments of the housing assembly and the distributor (60) shown in the Figures do not rely on a water-tight threaded connection between the housing canister (20) and the distributor (60). This is possible because, as shown in FIG. 4, the arrangement of the housing lid (22), in conjunction with the housing canister (20), filter cartridge upper cap (44) and shut-off valve (160), and sealing elements between them collectively provide for a water-tight connection between the housing interior (24) and the distributor (60). In one embodiment, this water-tight seal may be rated to remain water-tight up to pressures of 150 psi.

In the embodiment shown in the Figures, the housing assembly is removably attached to the distributor (60) by a bayonet-type mount. Referring to the embodiment shown in FIG. 6, the outer surface of the housing lid (22) defines a pair of L-shaped slots (46a, 46b) spaced about 180 degrees apart from each other. Referring to the embodiment shown in FIG. 7, the bottom surface of the distributor (60) defines a pair of radially inwardly extending tabs (48a, 48b) spaced about 180 degrees apart from each other. In other embodiments, the housing lid (22) may define the tabs, while the distributor (60) defines the L-shaped slots. To secure the housing assembly to the distributor (60), the user positions the housing assembly so that the tabs (48a, 48b) are aligned with the vertical leg of the L-shaped slots (46a, 46b). In this position, the arrow marking (38) on the housing lid (22) is aligned with the open padlock icon marking (39c) on the distributor (60). As the user rotates the housing assembly relative to the distributor (60), the tabs (48a, 48b) must pass through a stepped-shaped detent in the vertical leg of the L-shaped slots (46a, 46b). Upon doing so, the housing assembly moves upward into closer engagement with the distributor (60). The stepped-shaped detent may also provide the user with positive tactile feedback, or auditory feedback (e.g., a "click" sound), to indicate that the housing assembly is secured to the distributor (60). In this position, the arrow marking (38) on the housing lid (22) is aligned with the closed padlock icon marking (39b) labelled "OFF" on the distributor (60). Further rotation of the housing assembly relative to the distributor (60) will result in alignment of the arrow marking (38) on the housing lid (22) with the closed padlock icon marking (39a) labelled "FLOW ON" on the distributor (60).

Shut-Off Valve.

The apparatus (10) may also comprise a shut-off valve (160) for regulating water flow between the housing interior (24) and the distributor inlet (62), and the distributor outlet (64). In the embodiment shown in FIGS. 4 and 8, the shut-off valve (160) comprises a substantially cylindrical tubular member having two shut-off valve apertures (162a, 162b) formed through its walls. Sealing elements in the form of O-ring gaskets are provided around the shut-off valve (160) to create a water-tight seal with inner walls of the distributor (60). In this embodiment, the shut-off valve apertures (162a, 162b) are spaced about 180 degrees apart from each other, so that they can be aligned with the distributor inlet (62) and distributor outlet (64). Referring to FIG. 4, when the aperture (162a) is aligned with the distributor inlet (62), the aperture (162a) forms part of the inflow passage from the distributor inlet (62), through the annular space defined between the portion of the housing lid (22) defining the central housing lid aperture (30) and the upper end of the upper filter cartridge cap (44), to the feed zone (26) of the housing interior (24). Referring to FIG. 4, when the aperture (162b) is aligned with the distributor outlet (64), the aperture (162b) forms part of the outflow passage from the filtrate zone (28) of the housing interior (24), through the opening (45) of the upper filter cartridge cap (44), to the distributor outlet (64). As seen in FIG. 4, an internal structure of the shut-off valve (160) and the sealing relationship of the shut-off valve (160) to the upper end of the upper filter cartridge cap (44) isolates the inflow passage from the outflow passage.

Referring to FIG. 4, the top end of the shut-off valve (160) is attached to the bottom surface of the distributor (60) by a screw and nut assembly (164), while remaining free to rotate relative to the distributor (60). Referring to FIG. 8, the bottom end of the distributor (60) defines a pair of notches (166a, 166b) spaced about 180 degrees apart from each other. Referring to the embodiment shown in FIG. 6, the upper surface of the housing lid (22) forms a pair of protrusions (168a, 168b) that engage the notches (166a, 166b). Accordingly, when the user rotates the housing assembly relative to the distributor (60), the shut-off valve (160) rotates in unison with the housing assembly. When the housing assembly is positioned so that the arrow marking (38) on the housing lid (22) is aligned with the closed padlock icon marking (39b) labelled "OFF" on the distributor (60), the shut-off valve (160) is in a closed position in which the shut-off valve apertures (162a, 162b) are misaligned with the distributor inlet (62) and the distributor outlet (64), so that the shut-off valve (160) prevents water flow from the distributor inlet (62) to the housing interior (24), and from the housing interior (24) to the distributor outlet (64). When the user further rotates the housing assembly so that the arrow marking (38) on the housing lid (22) is aligned with the closed padlock icon marking (39a) labelled "FLOW ON" on the distributor (60), the shut-off valve (160) is in an open position in which the shut-off valve apertures (162a, 162b) are aligned with the distributor inlet (62) and the distributor outlet (64) to permit water flow from the distributor inlet (62) to the housing interior (24), and from the housing interior (24) to the distributor outlet (64). In this position, the housing assembly is also fully secured to the distributor (60).

Pressure-Relief Valve.

In the embodiment shown in FIG. 9, the housing lid (22) comprises a pressure-relief valve (180) for relieving gas pressure from the housing interior (24) when the housing lid (22) is attached to the housing canister (20). On account of the sealing relationship between the housing lid (22) and the housing canister (20), air entrained in water flowing through the housing interior (24) may become trapped within the upper end of the housing interior (24). The trapped air may result in excessive backpressure that impedes water flow through the housing interior (24). The pressure-relief valve (180) may be opened to allow the trapped air to escape from the housing interior (24). In the embodiment shown in FIG. 9, the pressure-relief valve (180) includes a button (182) on the upper surface of the housing lid (22), a screw (184) passing through a washer (186) and an opening (188) formed in the housing lid (22) and attached to the bottom end of the button, and a spring (190) disposed between the upper surface of the housing lid (22) and the bottom surface of the button (182) to bias the button (182) to a position that occludes the opening (188) in the housing lid (22).

In the embodiment shown in the Figures, the bottom surface of the distributor (60) is contoured to engage the button (182) as the housing assembly is rotated relative to the distributor (60). More specifically, when the housing assembly is rotated such that the arrow marking (38) on the housing lid (22) is aligned with the closed padlock icon marking (39a) labelled "OFF" on the distributor (60), the bottom surface of the distributor (60) pushes downward against the biasing force of the spring (190), so that the button (182) exposes the opening (188) in the housing lid (22) to allow gas flow out of the housing interior (24). Conversely, when the housing assembly is rotated such that the arrow marking (38) on the housing lid (22) is aligned with the closed padlock icon marking (39a) labelled "FLOW ON" on the distributor (60), the bottom surface of the distributor (60) allows the button (182) to return to its upwardly biased position in which it occludes the opening (188) in the housing lid (22), thus preventing gas flow out of the housing interior (24).

Inlet and Outlet Fittings, Bracket, and Fasteners.

Figure 10:
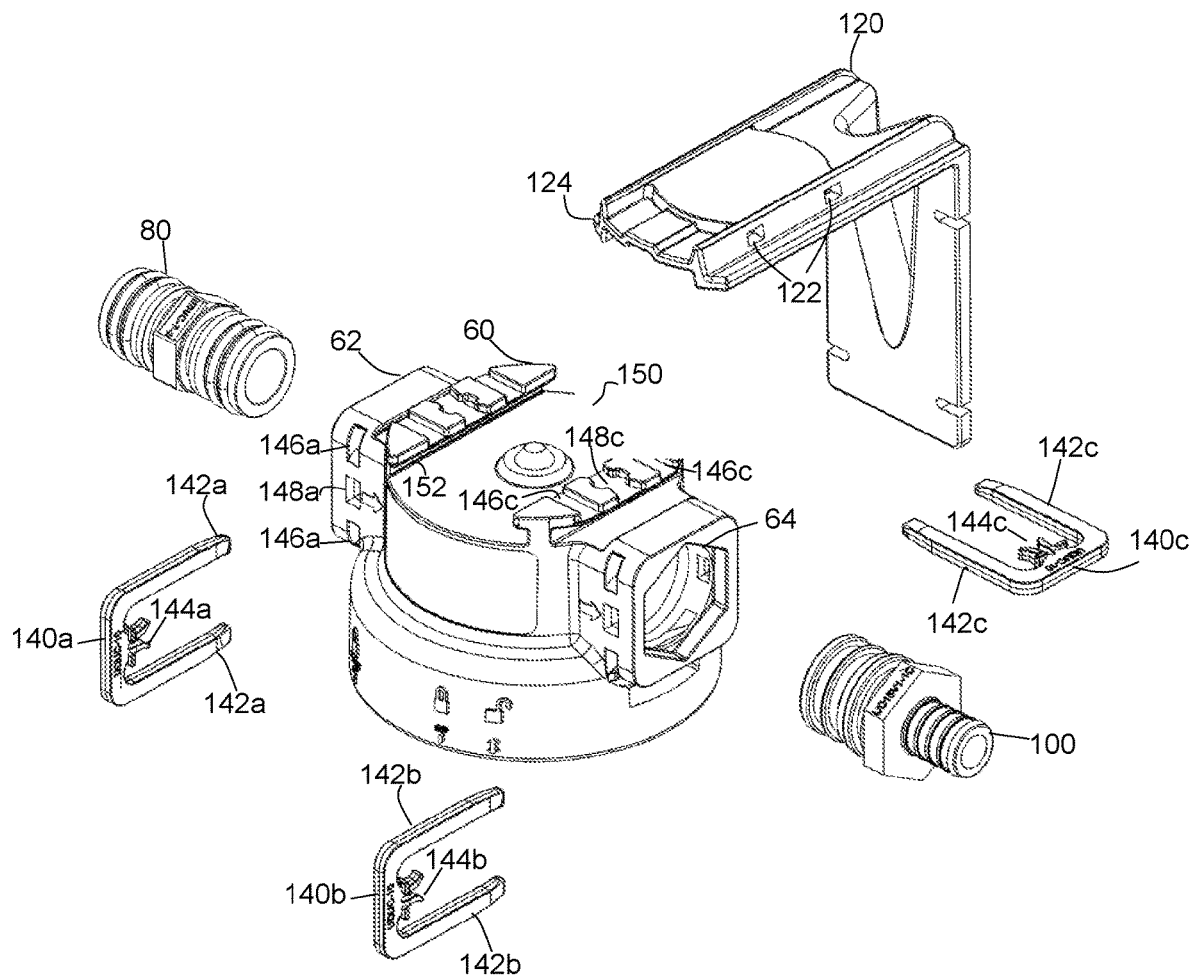
FIG. 10 shows an exploded perspective view of the assembly of the distributor, fittings, bracket, and fasteners of the apparatus of FIG. 2.

In the embodiment shown in FIG. 10, the apparatus (10) includes an inlet fitting (80) and an outlet fitting (100). The inlet fitting (80) and the outlet fitting (100) are used to connect the apparatus (10) to an inflow line and an outflow line, respectively, which in use may be lines of a plumbing network, or the distributor inlet (62) or the distributor outlet (64) of another apparatus (10) when the apparatus (10) is used in a multi-stage water filtration system. In the embodiment shown in FIG. 10, the inlet fitting (80) is adapted for connection to the distributor outlet (64) of the distributor (60) of another apparatus (10) of the present invention, while the outlet fitting (100) is adapted for a quick connection to a cross-linked polyethylene (PEX) outflow line. It will be understood that the present invention is not limited by any particular configuration of the inlet fitting (80) and the outlet fitting (100), which may be provided in a variety of sizes, configurations (e.g., straight and elbow configurations), and with a variety of sealing elements to suit different inflow and outflow lines.

In the embodiment shown in FIG. 10, the apparatus (10) also includes three identical fasteners (140a, 140b, 140c). Each of the fasteners has a pair of opposed clip members (142). Each of the fasteners (140a, 140b, 140c) also has a tab (144) with a pair of tab members. In one embodiment, the fasteners (140a, 140b, 140c) may be made from propylene copolymer or other materials, allowing the clip members to be resiliently separated from each other, and allowing the tab members to be resiliently compressed towards each other.

In the embodiment shown in FIG. 10, a first fastener (140a) is used to removably secure the inlet fitting (80) in the distributor inlet (62). After the inlet fitting (80) is inserted into the distributor inlet (62), the fastener (140a) is pushed so that the clip members (142a) are forced through passages (146a) defined by the distributor (60), and the tab (144a) is pushed into a slot (148a) defined by the distributor (60), whereupon the tab members are compressed by the slot (148a) to better secure the fastener (140a) to the distributor (60). The passages (146a) defined by the distributor (60) allow the clip members of the fastener (140a) to contact and clamp against the inlet fitting (80), and thereby removably secure the inlet fitting (80) within the distributor inlet (62). In order to remove the inlet fitting (80) from the distributor inlet (62), the fastener (140a) is simply pulled so that the clip members (142a) are withdrawn from the passages (146a) and the tab (144a) is withdrawn from the slot (148a). A second fastener (140b) is used in an analogous manner to removably secure the outlet fitting (100) in the distributor outlet (64).

In the embodiment shown in FIG. 10, the apparatus (10) also includes a bracket (120) for mounting the apparatus (10) to a structure (e.g., an inner wall of a cabinet under a sink). An upper portion defines a pair of bracket apertures (122).

In the embodiment of FIG. 10, a third fastener (140c) is used to removably secure the bracket (120) to distributor (60). When the bracket (120) is inserted in a groove (150) defined by the upper surface of the distributor (60), the bracket apertures (122) are aligned with the passages (146c) defined by the distributor (60). The edges of the groove (150) define channels (152) that receive the edges (124) of the bracket (120) to retain the bracket (120) to the distributor (60). The fastener (140c) may then be pushed so that the clip members (142c) are forced through passages (146c) defined by the distributor (60) and the bracket apertures (122), and the tab (144c) is pushed into a slot (148c) defined by the distributor (60), whereupon the tab members are compressed by the slot (148c) to better secure the fastener to the distributor (60). The passages (146c) defined by the distributor (60) allow the clip members (142c) of the fastener (140c) to contact and clamp against the inner walls of the bracket (120) that define the bracket apertures (122), and thereby removably secure the bracket (120) to the distributor (60). In order to remove the bracket (120) from the distributor (60), the fastener (140c) is simply pulled so that the clip members (142c) are withdrawn from the passages (146c) and bracket apertures (122), and the tab (144c) is withdrawn from the slot (148c).

Use and Operation.

Figure 11:
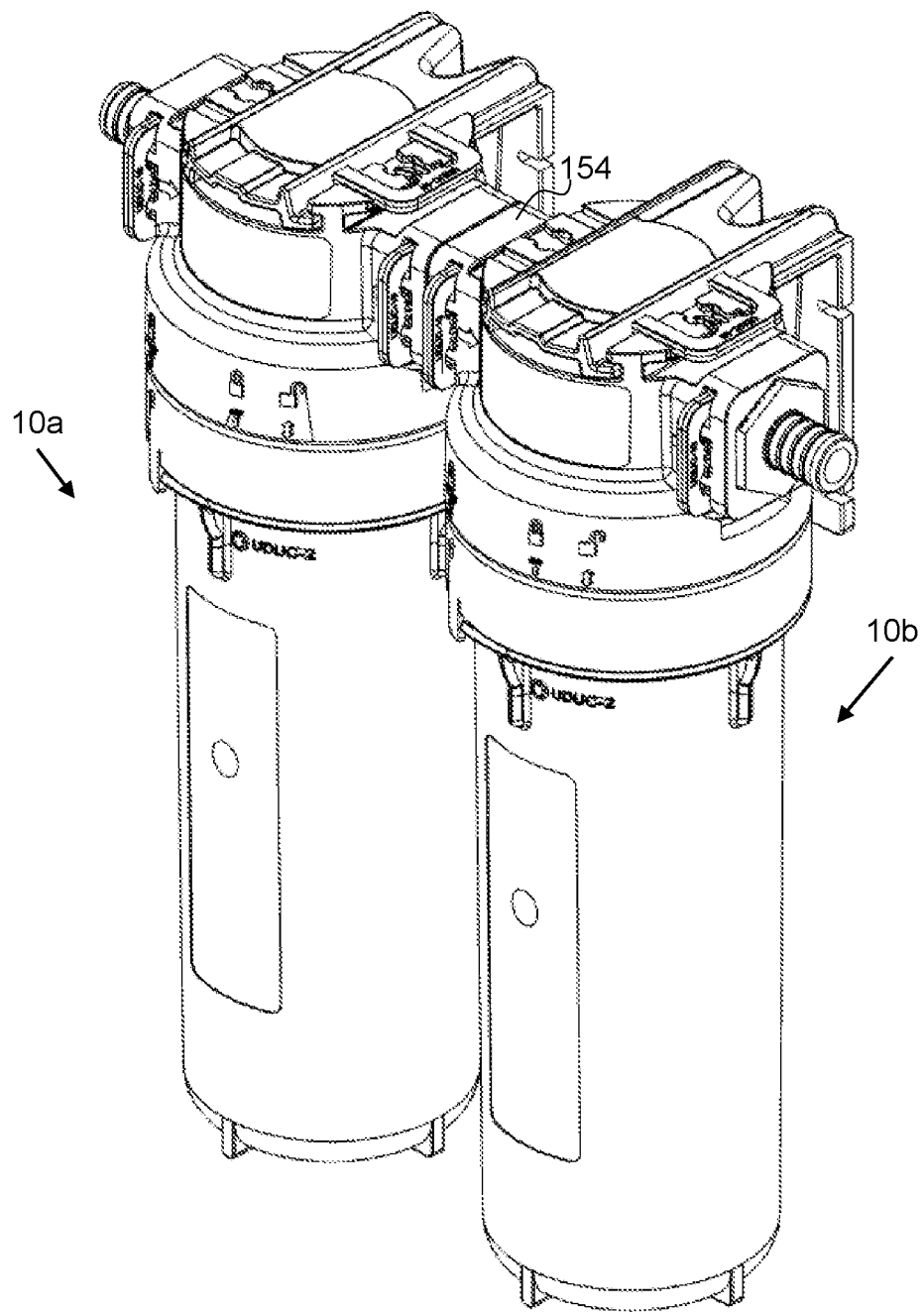
FIG. 11 shows a perspective view of two of the apparatuses of FIG. 2 connected together in a multi-stage water filtration system, with each of the apparatuses having an attached bracket.

In an exemplary use of the embodiment of the apparatus (10) shown in FIG. 11, two apparatuses (10a, 10b) may be connected together in a two-stage water filtration system. In other embodiments, a single apparatus (10) may be used in a single-stage system, or additional apparatuses (10) may be connected for a greater number of stages. As non-limiting examples, the system may be a point-of-use system beneath a sink to filter water for a single faucet, or as a larger point-of-entry or "whole home" system in a basement or a utility room to filter water for a plumbing network. In the embodiment shown in FIG. 11, the inlet fitting (80) of the first apparatus (10a) and the outlet fitting (100) of the second apparatus (10b) are connected to an inflow line and an outflow line, respectively, of the plumbing network (not shown). A fitting directly connects the distributor outlet (64) of the first apparatus (10a) to the distributor inlet (62) of the second apparatus (10b).

Figure 12:
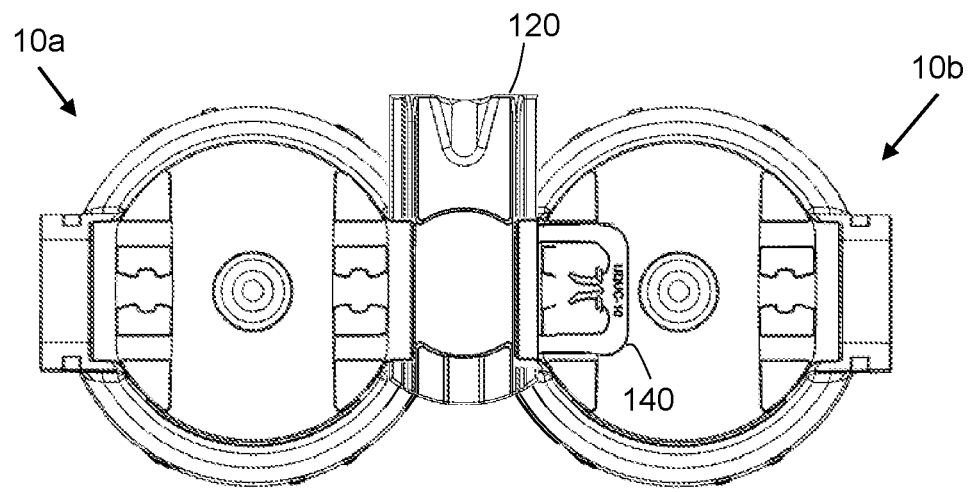
FIG. 12 shows a top view of two of the apparatuses of FIG. 2 connected together in a multi-stage water filtration system, with the apparatuses having a single attached bracket.

Referring to the embodiment shown in FIG. 11, when two of the apparatuses (10a, 10b) are placed side-by-side, with their distributors (60) abutting each other, the two distributors (60) collectively define a groove (154) that has dimensions that are the same as the groove (150) defined by a single one of the distributors (60) as shown in FIG. 10. Accordingly, as shown in FIG. 12, a single bracket (120) may be inserted into the groove (154) and secured to both distributors (60) with a fastener (140) and used to mount both apparatuses (10a, 10b) to a structure, as an alternative to attaching one bracket (120) to each distributor (60) as shown in FIG. 11.

When a filter cartridge in one of the apparatuses (10) requires replacement, the user rotates the housing assembly relative to the distributor (60) of that apparatus (10) so that the arrow marking (38) on the housing lid (22) moves from the closed padlock icon marking (39a) labelled "FLOW ON" on the distributor (60) to the open padlock icon marking (39c) on the distributor (60). When doing so, the housing lid (22) engages the shut-off valve (160) and moves it from the open position to the closed position, thereby isolating the apparatus (10) from its connected inflow and outflow lines. Also, the bottom surface of the distributor (60) engages pressure-relief valve (180) to move it from the closed position to the open position to relieve any gas trapped in the housing.

In comparison with a conventional water filtration system, embodiments of the apparatus (10) of the present invention may be advantageous in the follow respects. First, no tools, or specialized skill is needed to connect the apparatuses (10) together, to the inflow and outflow line, or to the bracket (120). Rather, such connections may be made entirely by hand with the use of the provided fasteners (140). Second, on account of their modular nature, one of the apparatuses (10) may be conveniently removed from the system for servicing, or additional apparatuses (10) may be readily added to the system to increase the number of filtration stages. Third, the modular nature of the apparatuses (10) simplifies manufacturing and inventory management of the apparatus (10) for manufacturers and vendors of the apparatus (10). Fourth, no isolation valves need to be installed on the inflow and outflow lines, since each of the apparatuses (10) is equipped with its own internal shut-off valve (160). Fifth, there is no need for the user to undertake separate steps of closing valves on the inflow and outflow lines prior to removing the housing assembly from the distributor (60). This is because the shut-off valve (160) and the pressure-relief valve (180) are actuated by the rotation of the housing assembly relative to the distributor (60) that also results in detachment of the housing assembly from the distributor (60). Sixth, the amount of torque required by the user to rotate the housing assembly relative to the distributor (60) using the bayonet-style mount may be considerably less than the torque required to unscrew a housing that is screwed onto a distributor with brute force to create a water-tight seal. The amount of torque required to screw the housing assembly onto the distributor (60) may be within the range that can be applied by hand of a typical user without the assistance of any tool. Seventh, upon removing the housing assembly from the distributor (60), the housing lid (22)

remains attached to the housing canister (20) to reduce the risk of spillage of any water contained in the housing canister (20).

Interpretation.

References in the specification to "one embodiment", "an embodiment", etc., indicate that the embodiment described may include a particular aspect, feature, structure, or characteristic, but not every embodiment necessarily includes that aspect, feature, structure, or characteristic. Moreover, such phrases may, but do not necessarily, refer to the same embodiment referred to in other portions of the specification. Further, when a particular aspect, feature, structure, or characteristic is described in connection with an embodiment, it is within the knowledge of one skilled in the art to affect or connect such module, aspect, feature, structure, or characteristic with other embodiments, whether or not explicitly described. In other words, any module, element or feature may be combined with any other element or feature in different embodiments, unless there is an obvious or inherent incompatibility, or it is specifically excluded.

It is further noted that the claims may be drafted to exclude any optional element. As such, this statement is intended to serve as antecedent basis for the use of exclusive terminology, such as "solely," "only," and the like, in connection with the recitation of claim elements or use of a "negative" limitation. The terms "preferably," "preferred," "prefer," "optionally," "may," and similar terms are used to indicate that an item, condition or step being referred to is an optional (not required) feature of the invention.

The singular forms "a," "an," and "the" include the plural reference unless the context clearly dictates otherwise. The term "and/or" means any one of the items, any combination of the items, or all of the items with which this term is associated. The phrase "one or more" is readily understood by one of skill in the art, particularly when read in context of its usage.

The term "about" can refer to a variation of ±5%, ±10%, ±20%, or ±25% of the value specified. For example, "about 50" percent can in some embodiments carry a variation from 45 to 55 percent. For integer ranges, the term "about" can include one or two integers greater than and/or less than a recited integer at each end of the range. Unless indicated otherwise herein, the term "about" is intended to include values and ranges proximate to the recited range that are equivalent in terms of the functionality of the composition, or the embodiment.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. A recited range includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc.

As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio.

The invention claimed is:

1. An apparatus for filtering water, the apparatus comprising:
   (a) a housing assembly comprising a housing canister defining a housing interior for holding a filtration medium, and a housing lid removably attachable, in sealing relationship, to the housing canister, wherein the housing lid defines a housing lid aperture permitting water flow between the housing interior and a distributor wherein the housing lid comprises a pressure relief valve for relieving pressure from the housing interior;
   (b) the distributor defining at least part of an inflow passage for directing water flow from a distributor inlet to the housing interior, and at least part of an outflow passage for directing water flow from the housing interior to a distributor outlet; and
   (c) a shut-off valve for regulating water flow between the housing interior and the distributor inlet, and the distributor outlet, the valve comprising a cylindrical tubular member defining opposing valve apertures; and
   (d) wherein the housing assembly is removably attachable to the distributor by rotation relative to the distributor in a first direction, whereupon the housing assembly actuates movement of the shut-off valve to an open position where the opposing valve apertures are aligned with the inflow passage and the outflow passage from a closed position wherein valve apertures are not aligned with the inflow and outflow passages, and actuates movement of the pressure-relief valve to a closed position preventing gas flow out of the housing interior; and
   (e) wherein the housing assembly is detachable from the distributor by rotation relative to the distributor in a second direction opposite to the first direction, thereby moving the shut-off valve to the closed position and actuating movement of the pressure-relief valve to an open position permitting gas flow out of the housing interior.

2. The apparatus of claim 1, wherein the housing lid engages the shut off valve to actuate movement of the shut-off valve between the open position and the closed position.

3. The apparatus of claim 1, wherein the housing assembly is removably attachable to the distributor by a bayonet-type mount comprising an L-shaped slot formed by one of the housing lid and the distributor, and a radially extending tab formed by the other one of the housing lid and the distributor.

4. The apparatus of claim 3, wherein the L-shaped slot defines a stepped-shaped detent that causes the housing lid to move axially into engagement with the distributor upon movement of the radially extending tab past the stepped-shaped detent.

5. The apparatus of claim 1 wherein the filtration medium comprises a cap having a portion which extends into and engages the shut-off valve, such that fluid inflow or outflow to or from the housing interior passes through the cap, and inflow and outflow pass through concentric passages formed by the housing lid and filtration medium cap.

* * * * *